United States Patent [19]

McMillin et al.

[11] Patent Number: 5,317,812
[45] Date of Patent: Jun. 7, 1994

[54] WIRE FEEDING AND MEASURING APPARATUS

[75] Inventors: Fred J. McMillin, Warren, Ohio; Gerald E. Blaha, Waukesha, Wis.

[73] Assignees: Artos Engineering, New Berlin, Wis.; General Motors Corp., Detroit, Mich.

[21] Appl. No.: 847,918

[22] Filed: Mar. 6, 1992

[51] Int. Cl.$^5$ .................................. G01B 5/04
[52] U.S. Cl. .......................... 33/740; 33/747; 33/778
[58] Field of Search .............. 33/774:747, 748, 749, 33/735, 734, 733, 772, 776, 778, 740; 81/9.51

[56] References Cited

U.S. PATENT DOCUMENTS

| | | |
|---|---|---|
| 1,831,115 | 11/1931 | Holmes . |
| 2,680,394 | 6/1954 | Andren . |
| 2,884,825 | 5/1959 | Eubanks . |
| 2,886,995 | 5/1959 | Bach et al. . |
| 2,920,513 | 1/1960 | Baird et al. . |
| 3,270,930 | 9/1966 | Emerson . |
| 3,309,948 | 3/1967 | Falken . |
| 3,316,781 | 5/1967 | Bignell . |
| 3,318,005 | 5/1967 | Petersen ............................... 33/748 |
| 3,364,801 | 1/1968 | Johnston . |
| 3,368,428 | 1/1968 | Gumstad . |
| 3,385,139 | 5/1968 | Lloyd . |
| 3,394,853 | 7/1968 | Foley et al. . |
| 3,411,216 | 11/1968 | Evans et al. . |
| 3,579,842 | 5/1971 | Scher . |
| 3,612,111 | 10/1971 | Meyer ..................................... 140/1 |
| 3,612,369 | 10/1971 | Grebe ..................................... 226/24 |
| 4,377,898 | 3/1984 | Hara ....................................... 29/564 |
| 4,457,071 | 7/1984 | Alphonso . |
| 4,646,442 | 3/1987 | Bhattacharya et al. .............. 33/778 |
| 4,699,207 | 10/1987 | Hanemaayer ........................ 165/41 |
| 4,924,596 | 5/1990 | Vachon ................................. 33/715 |
| 5,060,395 | 10/1991 | Pepin ..................................... 33/735 |
| 5,065,527 | 11/1991 | Shaw ..................................... 33/744 |
| 5,067,248 | 11/1991 | Nortenius et al. ................... 33/744 |
| 5,109,598 | 5/1992 | Koch ..................................... 33/735 |
| 5,155,922 | 10/1992 | Cooper .................................. 33/747 |

FOREIGN PATENT DOCUMENTS 184327 of 1922 United Kingdom .
2154000 of 1985 United Kingdom .

Primary Examiner—William A. Cuchlinski, Jr.
Assistant Examiner—William C. Dowling
Attorney, Agent, or Firm—Andrus, Sceales, Starke & Sawall

[57] ABSTRACT

An improved wire feeding and measuring apparatus having a pair of cooperating feed belts to feed a wire in an axial direction. A drive wheel is located downstream of the feed belts and rotates in contact with the wire at a slightly faster speed than the feed belts, while a measuring wheel, operably connected to an encoder, is also engaged with the wire and is located opposite the drive wheel. The measuring wheel is biased toward the drive wheel by a spring exerting a light force. Guides are associated with each wheel and each guide includes a wire supporting surface and a slot located adjacent the supporting surface. The periphery of each wheel projects a slight distance through the slot in the respective guide and engages the wire. The guides maintain the wire in a tangential relation to the periphery of the wheels and prevent wrap around of the wire on the wheels.

13 Claims, 5 Drawing Sheets

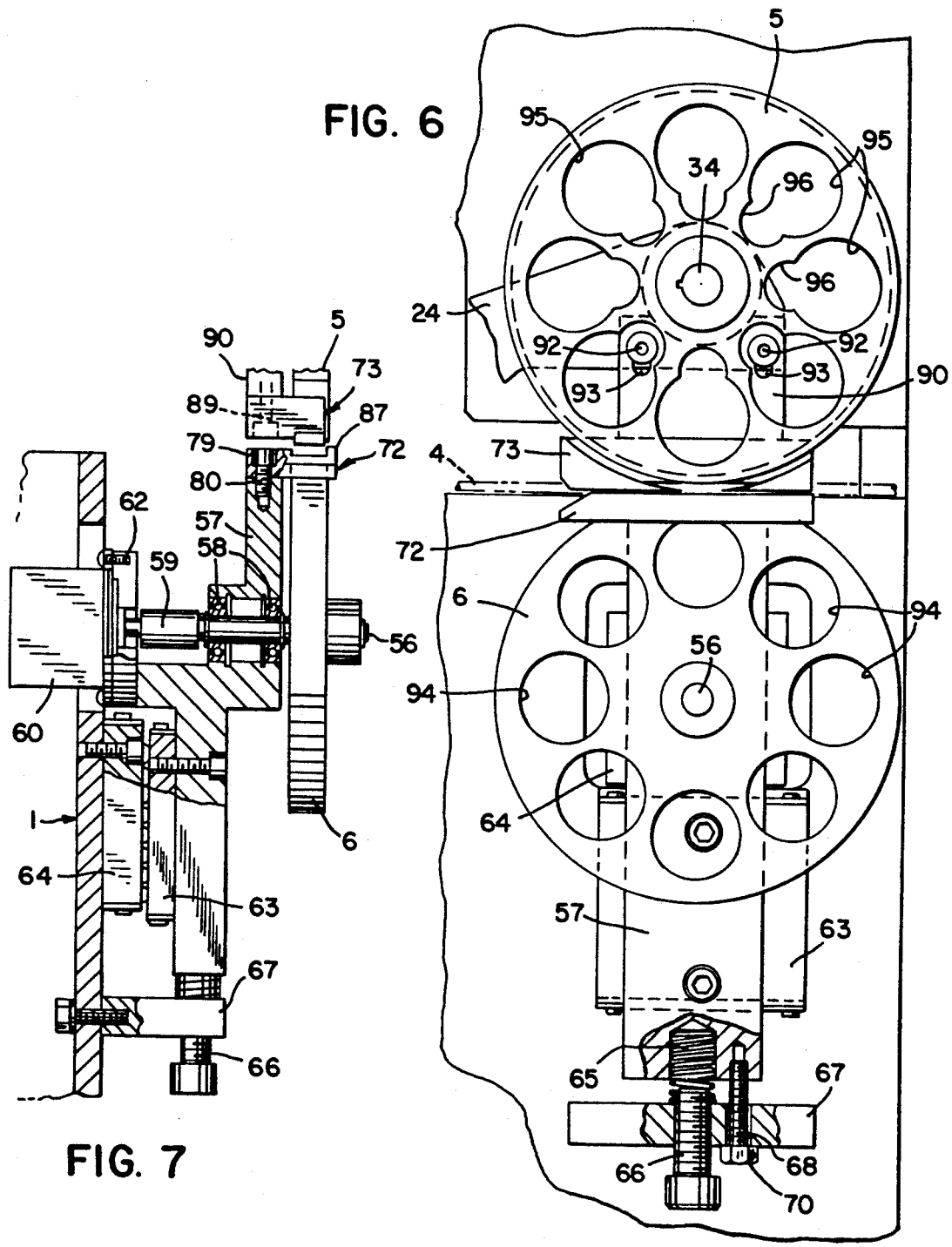

WIRE FEEDING AND MEASURING APPARATUS

BACKGROUND OF THE INVENTION

The conventional wire feeding and measuring apparatus feeds a wire from a supply reel in an axial direction to wire processing equipment. The processing equipment may, for example, be a wire cutter or a cutter-stripper which serves the wire into segments of predetermined length and strips the insulation from the severed end of the wire.

In a typical wire feeding and measuring apparatus, as described in U.S. patent application Ser. No. 07/480,770, filed Feb. 15, 1990, the wire is fed by a pair of cooperating endless feed belts formed of an elastomeric material which engage opposite sides of the wire. The feed belts are intermittently driven by a servo motor which is programmed to operate the feed belts forwardly to feed a predetermined length of wire and then stop movement of the wire. A wire measuring means in the form of a measuring wheel, that is located upstream of the feed belt, measures the actual distance the wire has moved and provides a feedback signal through an encoder to a controller. In the event wire slippage occurred during forward feeding movement, the controller employs the feedback signal to ascertain whether less or more wire than the predetermined length has actually been fed, and commands the feed belts to feed the wire either forwardly or in reverse to correct for the discrepancy. The wire measuring wheel senses the direction and distance the wire moves during the correction operation and signals the controller accordingly, thereby enabling the controller to actuate the feed means to stop wire movement when the predetermined length has been fed.

The typical wire feeding and measuring machine, operating in the manner described above, is very accurate and repeatable, if a single gauge of wire is processed. However, if a different gauge of wire, or a different type or thickness of insulation is employed, the system must be recalibrated. Recalibration for a different gauge or type of wire requires the initial length of wire to be measured to determine whether the length has been precisely cut to the predetermined length and to reset the machine, if there is a variance. After resetting, the procedure is repeated to check the actual cut length against the predetermined length. This trial and error calibration procedure not only is time consuming, but also can result in considerable scrappage of wire.

SUMMARY OF THE INVENTION

The invention is directed to an improved wire feeding and measuring apparatus, which is capable of more accurately measuring the length of a wire lead produced on an automated wire processing machine, and thus facilitates recalibration when changing from one gauge of wire to another.

In accordance with the invention, the insulated wire is fed from a reel or coil in a downstream direction by a pair of cooperating endless feed belts, preferably formed of an elastomeric material. A hard surface drive wheel, preferably formed of a metallic material, is located downstream of the feed belts and is engaged with the wire and is driven at a speed slightly faster than the speed of the feed belts. The measuring wheel is a hard surfaced measuring wheel, which is also engaged with the wire, and is located opposite the drive wheel. The measuring wheel is driven by the wire strand in either a forward or reverse direction, and drives an encoder which provides a feedback signal to the electronic controller.

The measuring wheel is biased toward the drive wheel by a spring exerting a light force in the range of about 2 to 4 lbs. This light biasing force, in combination with the light weight of the measuring wheel, enables the measuring wheel to accurately track the movement of the wire in both forward and reverse directions without undue deformation of the wire insulation, which could cause inaccuracies.

As a feature of the invention, a guide mechanism is associated with each of the wheels, and acts to maintain the wire in a tangential relation to the periphery of the wheel, thus preventing the wire from wrapping around the wheel. Each guide includes a pair of wire supporting surfaces which lie in a common plane, and a slot or opening is located between the pair of surfaces. The periphery of each wheel extends through the slot in the respective guide and is engaged with the wire. The guides retain the wire in a tangential relation to the peripheries of the wheels to provide a substantial line contact between each wheel and the wire, preventing wrap-around of the wire on the periphery of the wheels, which could cause inaccuracy in the measurement.

The downstream location of the hard surfaced drive and measuring wheels relative to the feed belts, the light biasing force on the measuring wheel, and the wire guides associated with the drive and measuring wheels, all cooperate to provide a more accurate and repeatable measurement of wire length, particularly when changing from one type or gauge of wire to another.

Other objects and advantages will appear in the course of the following description.

DESCRIPTION OF THE DRAWINGS

The drawings illustrate the best mode presently contemplated of carrying out the invention.

In the drawings:

FIG. 6 is an enlarged elevational view of the drive and measuring wheels;

FIG. 7 is an end view of the structure shown in FIG. 6 with parts broken away.

DESCRIPTION OF THE ILLUSTRATED EMBODIMENT

Figure 1:
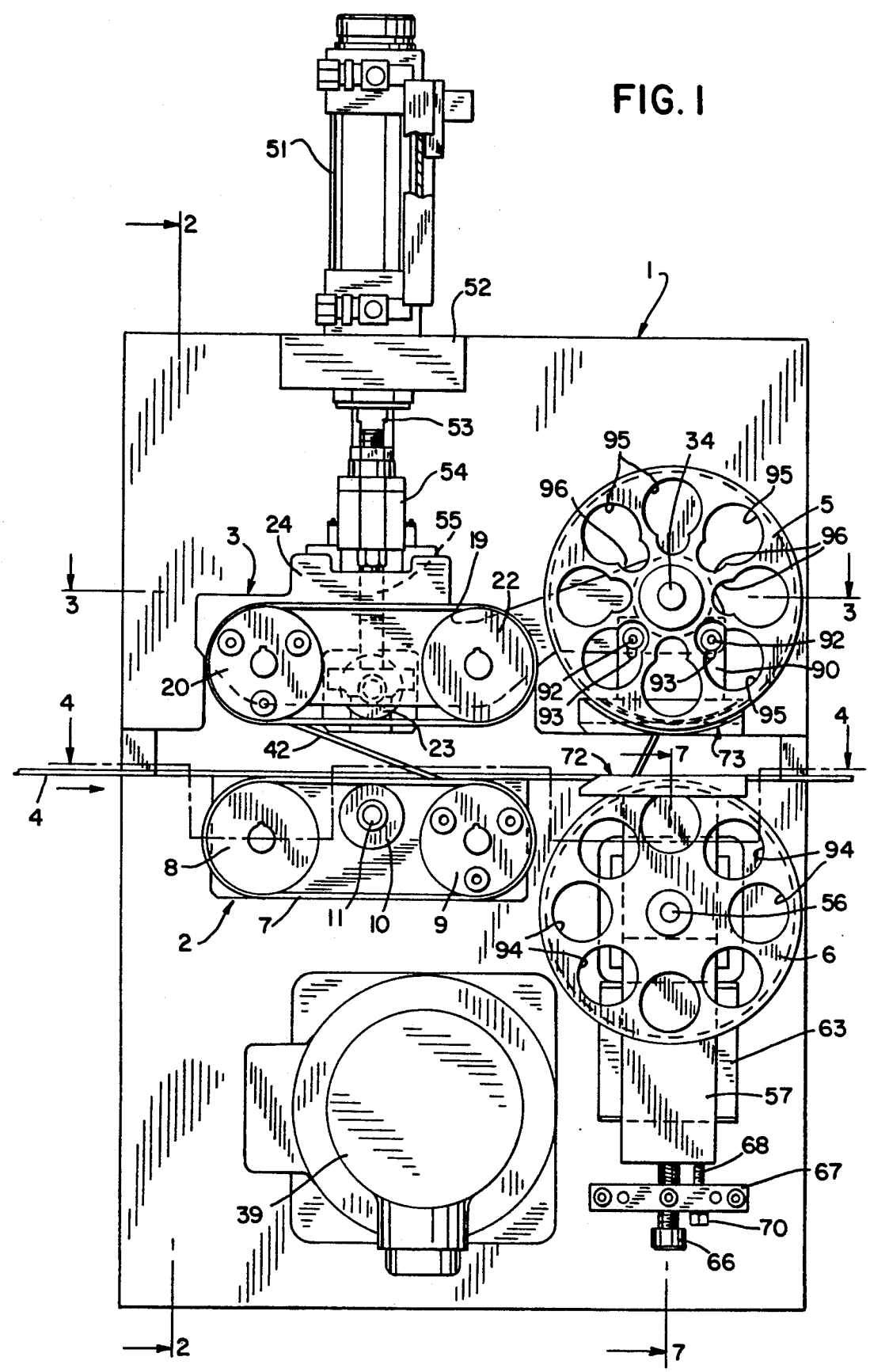
FIG. 1 is a side elevation of the wire feeding and measuring apparatus of the invention with the upper feed unit shown in the open position.
Figure 2:
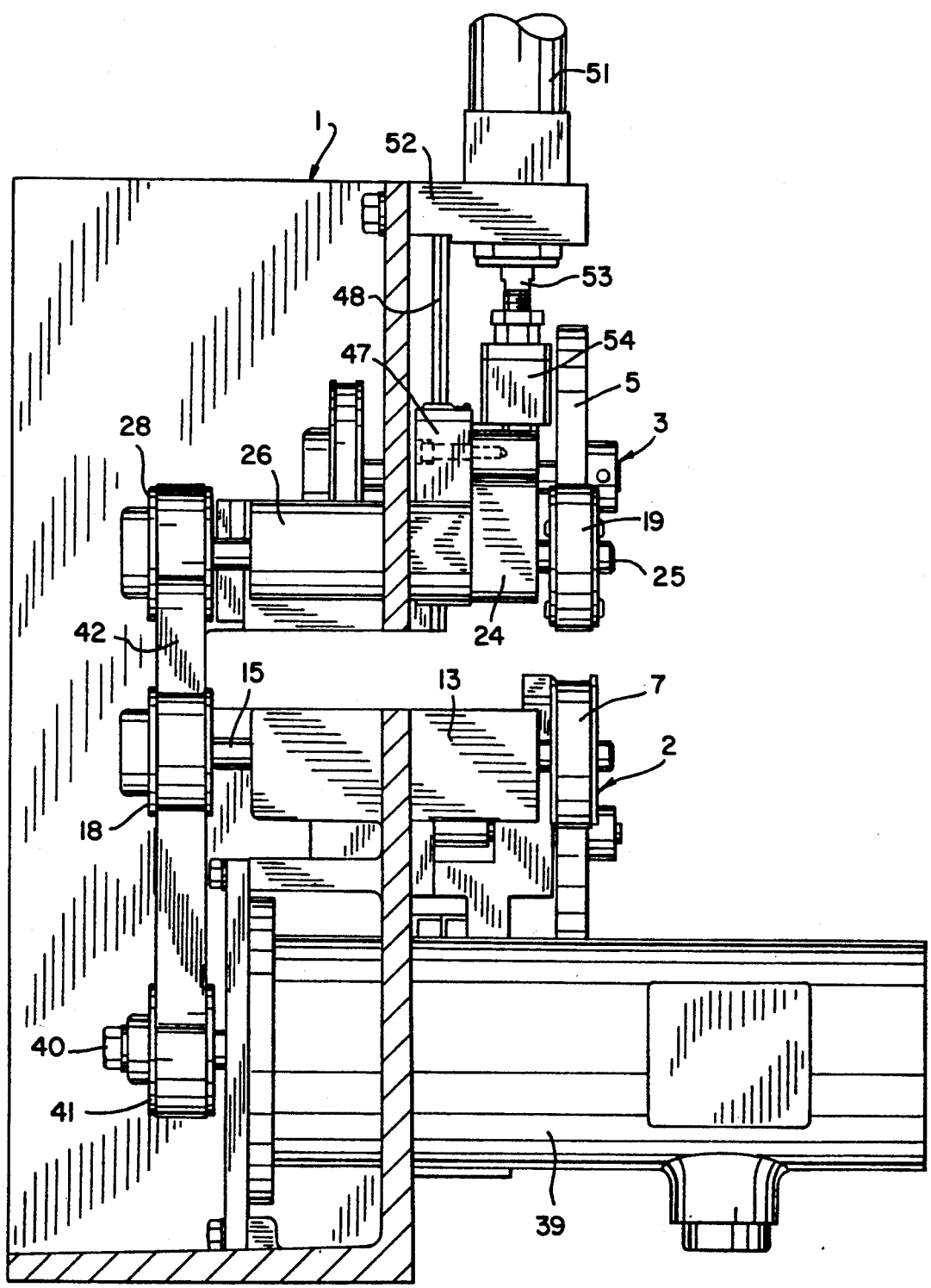
FIG. 2 is an end view of the apparatus shown in FIG. 1.

The drawings illustrate an improved wire feeding and measuring apparatus that comprises a frame or supporting structure 1, and a lower wire feeding unit 2 and an upper wire feeding unit 3 are mounted on frame 1 and cooperate to feed an insulated wire 4 axially through the apparatus. In addition, a drive wheel 5 is located downstream of the upper feed unit 3 and is engaged with the wire 4, while a measuring wheel 6 is located opposite the drive wheel 5 and is engaged with the opposite side of wire 4. The measuring wheel 6 is driven by the wire in either the forward or reverse direction and drives an encoder which provides a feedback signal to an electronic controller which controls operation of the feeding units 2 and 3, as will be hereinafter described.

Lower feeding unit 2 includes an endless belt 7 formed of an elastomeric material, such as urethane, which is trained over a pair of pulleys 8 and 9. In addition, an idler pulley 10 is located between pulleys 8 and 9 and supports the upper run of belt 7 against downward flexing movement. Idler pulley 10 is mounted on shaft 11, which is journaled for rotation on frame 1.

Figure 4:
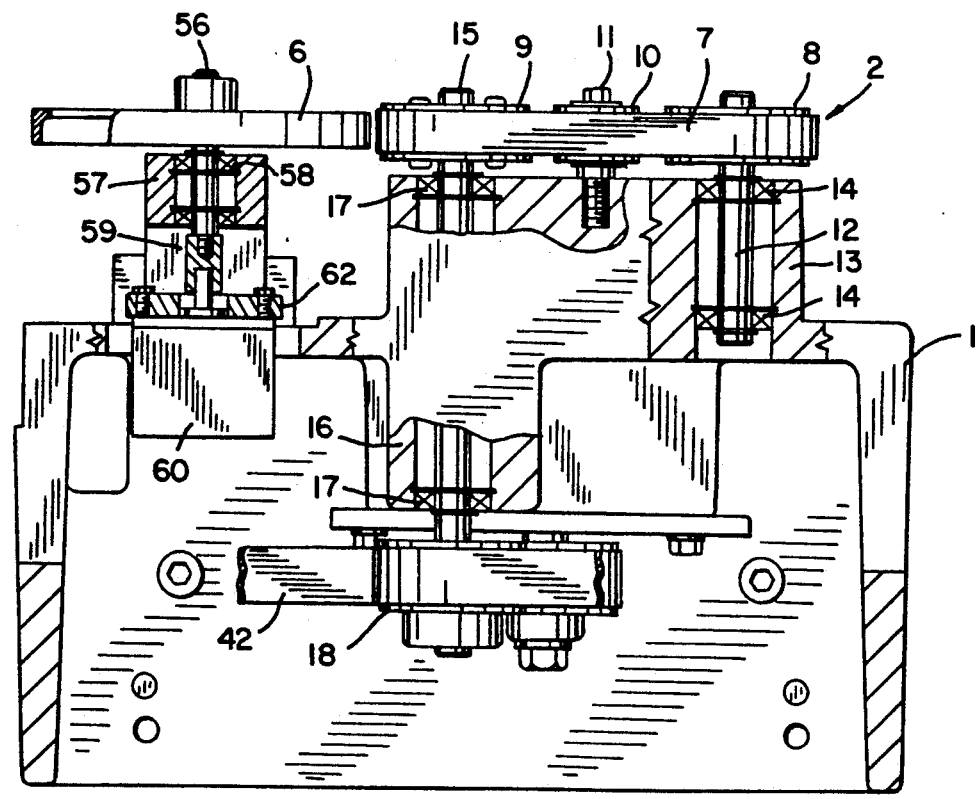
FIG. 4 is a section taken along line 4—4 of FIG. 1 with parts broken away.

As best shown in FIG. 4, pulley 8 is mounted on the end of a shaft 12, which is journaled within a hub 13 that projects outwardly from frame 1, by a pair of bearings 14. Pulley 9 is a driven pulley and is mounted on the end of a shaft 15 which is journaled for rotation within a sleeve 16 by a pair of bearings 17. The inner end of shaft 15 carries a pulley 18 that is connected to the drive mechanism, as will be hereinafter described.

The upper feed unit 3 also includes an endless flexible belt 19, preferably formed of a material such as urethane, which is mounted to travel on a pair of pulleys 20 and 22. Opposite sides of wire 4 are engaged by belts 7 and 19 to feed the wire axially through the apparatus.

An idler pulley 23 is located between the pulleys 20 and 22, and supports the lower run of belt 19 against upward flexing movement.

Figure 3:
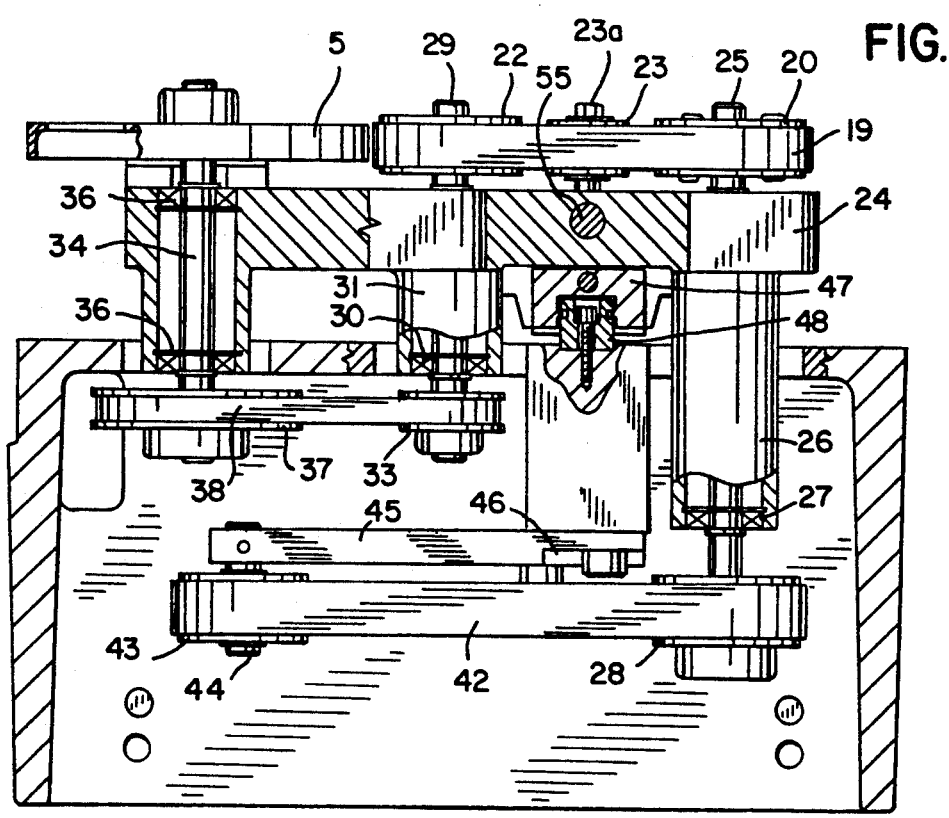
FIG. 3 is a section taken along line 3—3 of FIG. 1 with parts broken away in section.

Pulleys 20, 22 and 23 are mounted on a block or casting 24. In this regard, pulley 20 is secured to the outer end of a shaft 25, and the shaft is journaled for rotation within sleeve 26, which extends inwardly from casting 24, by a pair of bearings 27, only one of which is shown. The inner end of shaft 25 carries a pulley 28. Similarly, pulley 22 is mounted on the outer end of shaft 29, which is journaled by bearings 30 within sleeve 31 that extends inwardly from casting 24, and the inner end of shaft 29 carries a pulley 33, as illustrated in FIG. 3.

In addition, the idler pulley 23 is mounted for rotation on a shaft 23a which extends outwardly from casting 24.

Drive wheel 5 is located immediately downstream of the upper feed belt 19, and is preferably formed of a metallic material and has a hard, knurled, outer peripheral surface that is engaged with the wire 4. As illustrated in FIG. 3, drive wheel 5 is mounted on the outer end of a shaft 34, which is journaled within the end of casting 24 by a pair of spaced bearings 36. The inner end of shaft 34 carries a pulley 37, which is connected to pulley 33 by a timing belt 38, as shown in FIG. 3.

Figure 5:
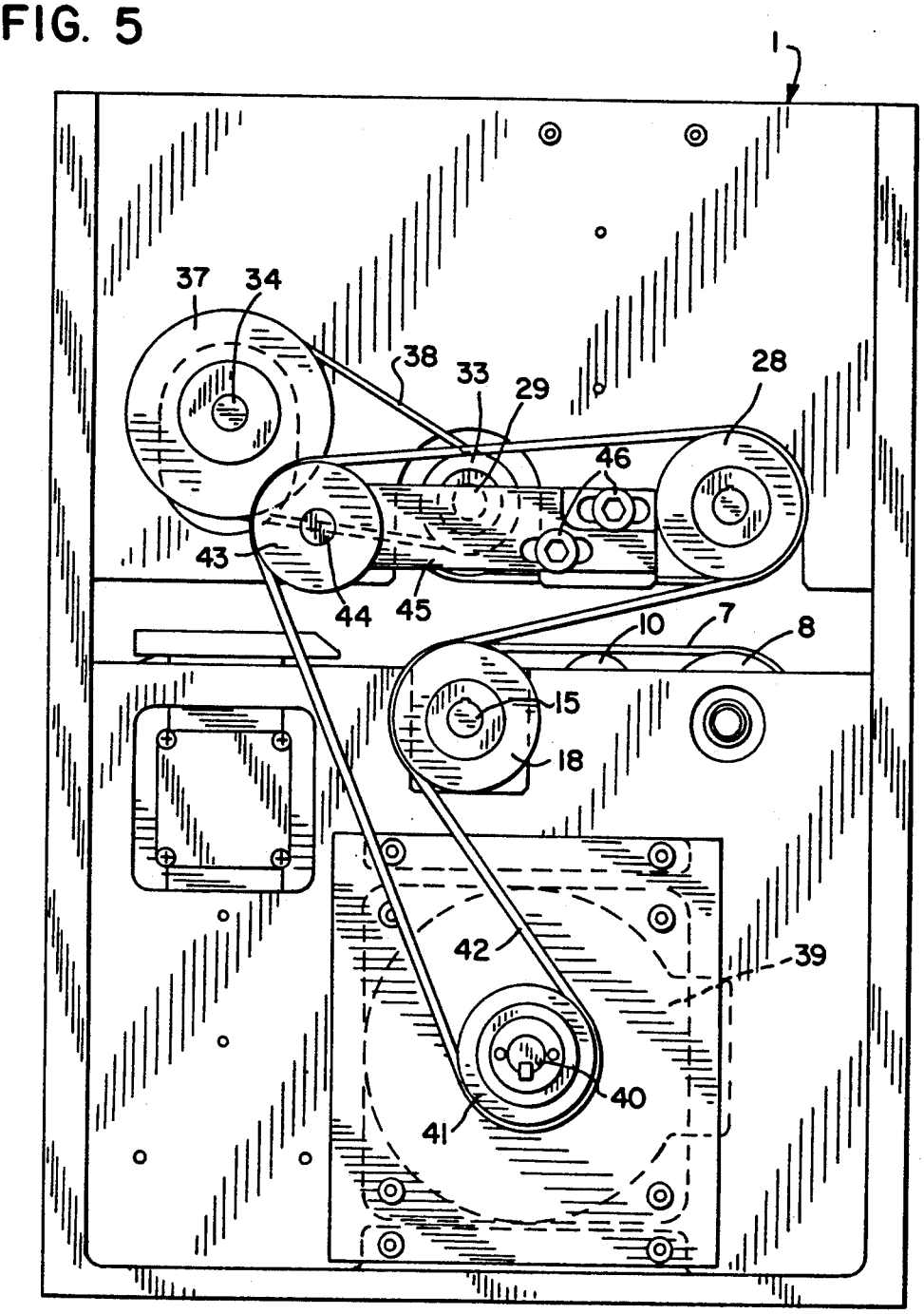
FIG. 5 is a rear elevation of the apparatus.

To drive the belts 7 and 19, as well as drive wheel 5, a servo motor 39 is mounted on frame 1, and the output shaft 40 of the servo motor carries a pulley 41, as seen in FIG. 5. A timing belt 42 is trained over the pulley 41, as well as over an idler pulley 43 and pulleys 28 and 18. Idler pulley 43, as illustrated in FIG. 5, is journaled on a shaft 44, which is secured to an end of an adjustable arm 45 that is mounted to frame 1 through slotted connection 46. With this drive arrangement, travel of belt 42 drives feed belts 7 and 19 in synchronization to feed the wire 4 axially through the apparatus and the slotted connection 46 provides an adjustment to maintain proper tension on drive belt 42.

Movement of the upper feed belt 19 in its endless path causes rotation of pulley 22, and this rotation is transmitted through shaft 29 to pulley 33 and then through belt 38 to pulley 37 on shaft 34, which is connected to the wheel 5, thus driving the wheel 5 in accordance with movement of the belt 19.

As a feature of the invention, the pulley 37 is sized such that the speed of rotation of wheel 5 will be slightly greater, approximately 2% greater, than the speed of travel of belts 7 and 19, thus ensuring that the portion of the wire extending between the feed belts 7 and 19 and the drive wheel 5 will be in a taut condition, without looping or sagging.

The upper drive unit 3 is adapted to be moved toward and away from the lower drive unit 2. As shown in FIG. 1, the upper drive unit is in the open position, where the belt 19 is spaced upwardly from the wire 4. By moving the upper drive unit toward the lower drive unit, the belt 19 will be brought into contact with the wire 4, so that operation of the belts 7 and 19 will thereby feed the wire in an axial or longitudinal direction. The geometry of the pulleys over which belt 42 is trained enables upper unit 3 to be moved relative to lower unit 2 and yet maintain the tension on belt 42.

To provide the movement for the upper drive unit 3, a ball bearing slide 47 is connected to casting 24, and is slidable on a vertical rail 48 that is connected to frame 1.

To move the upper drive unit 3, a pneumatic cylinder 51 is connected to frame 1 through bracket 52, and a piston rod 53, which is slidable relative to cylinder 51, is connected through coupling 54 to a stub shaft 55, which is threaded in the upper surface of casting or block 24. By supplying air to the upper end of cylinder 51, piston rod 53 will be extended to move the block 24 and upper drive unit 3 in a direction toward the lower drive unit 2. Conversely, introducing air into the lower end of cylinder 51 will retract the piston rod 53 to move the upper drive unit 3 in a direction away from the lower drive unit 2.

Measuring wheel 6, which is located opposite drive wheel 5, is preferably formed of a metallic material and has a hard, knurled outer peripheral surface that is engaged with the wire 4. As best shown in FIG. 7, measuring wheel 6 is mounted on the outer end of a shaft 56, and the shaft is journaled for rotation relative to block 57 by a pair of bearings 58. The inner end of shaft 56 is connected via a coupling 59 to an encoder 60. Encoder 60 is carried by a mounting bracket 62, which is connected to the inner surface of block 57.

The measuring wheel 6 is engageable with and driven by the wire 4 in either a forward or reverse direction, and drives the encoder 60, which, in turn, provides an electric feedback signal to an electronic controller, as disclosed in U.S. patent application Ser. No. 07/480,770, filed Feb. 15, 1990.

As a feature of the invention, a light biasing force is applied through measuring wheel 6 to the wire 4. In this regard, block 57 carries a slide plate 63, which is mounted for sliding movement on a guide plate 64 by a ball bearing mechanism. The guide mechanism permits the block 57 and the measuring wheel 6 to slide relative to frame 1.

To bias the measuring wheel 6 against the wire 4, one end of tension spring 65 is received within a hole in the lower end of block 57, as seen in FIG. 6, while an adjusting screw 66 is threaded within an opening in bracket 67 that projects outwardly from frame 1 and the end of screw 66 is engaged with the opposite end of spring 65. Through threaded adjustment of screw 66, the tension on the spring 65 can be adjusted. In practice, the spring exerts a biasing force in the amount of about 2.0 to 4.0 lbs. on the measuring wheel 6. This biasing force is substantially less than that used in conventional wire feeding and measuring machines, which usually employ a biasing force in the range of 8 to 10 lbs. The lesser spring force, along with the lightweight metal wheel 6, ensures that the wheels will not deform or protrude into the insulation on the wire 4, which could adversely affect the accuracy of the measurement of length.

A stop mechanism is utilized to limit the upper position of measuring wheel 6. A stop screw 68, as shown in FIG. 6, extends freely through an opening in bracket 67, and is threaded within a hole in the lower end of block 67. The head 70 of screw 69 is adapted to engage the lower surface of block 57 and serves as a stop to limit the upper position of the measuring wheel 6. Through adjustment of screw 68, the position of measuring wheel 6 can be correspondingly adjusted.

As a feature of the invention, a guide mechanism is associated with each wheel 5 and 6 to maintain the wire 4 in a tangential relation to the peripheries of the wheels and provide a substantial line contact between the wheels and the wire.

Figure 8:
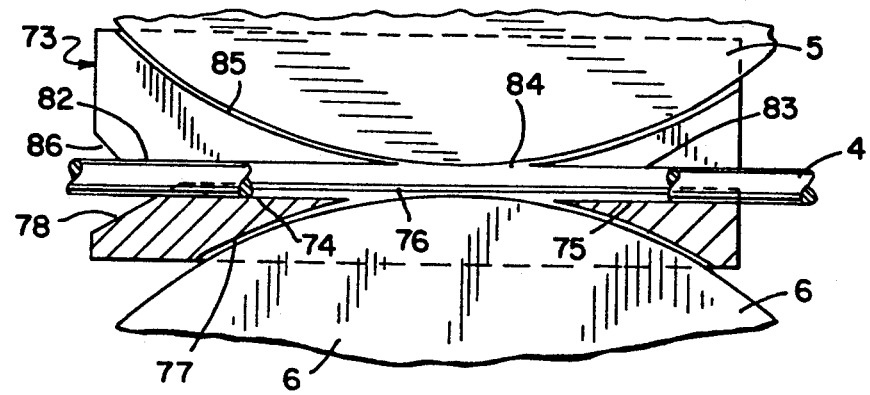
FIG. 8 is an enlarged fragmentary section showing the measuring wheel and the associated guide.

The guide mechanism includes a lower guide 72 associated with measuring wheel 6, and an upper guide 73 which is associated with drive wheel 5. As best seen in FIG. 8, lower guide 72 includes a pair of upper flat surfaces 74 and 75, which lie in a common plane and are spaced apart by a slot or opening 76.

The lower surface of guide 72 is provided with a curved recess 77, which receives and complements the periphery of the measuring wheel 6, as shown in FIG. 8. The upstream end of guide 72 is provided with an inclined surface or ramp 78, which merges into the surface 74.

To mount guide 72 on block 57, the guide is formed with a lateral flange or extension 79, which is connected by screws 80 to the upper edge of block 57, as best shown in FIG. 7.

The periphery of measuring wheel 6 extends through slot 76 and projects a slight distance, generally in the range of about 0.015 inch above the surfaces 74 and 75 and is engaged with wire 4.

Upper guide 73 is also provided with a pair of flat surfaces 82 and 83 which lie in a common plane and border a central slot or opening 84. The upper portion of guide 73 is formed with a generally curved or arcuate recess 85, which complements and receives the drive wheel 5. In addition, the upstream edge of guide 73 has a chamfer or bevel 86, which merges with the surface 82.

As best shown in FIG. 7, lower guide 72 is provided with a longitudinal upstanding rib 87 and upper guide 73 is received between rib 87 and flange 79.

Upper guide 73 is connected to casting or block 24. In this regard, guide 73 is formed with a lateral extension or flange 88, which is connected by screws 89 to an adjusting plate 90. A pair of screws 92 extend through slotted holes 93 in plate 90, and are threaded to the casting 24. The slotted holes 93 permit the guide 73 to be adjusted in a direction toward and away from the guide 72. As in the case of the measuring wheel 6, the periphery of drive wheel 5 projects through the slot 84 a distance of approximately 0.015 inches, beneath the surfaces 82 and 83.

The guide surfaces 74,75 on guide 72 and 82 and 83 on guide 73 serve to maintain the wire in a tangential relation with the peripheries of the wheels 5 and 6, and prevent the wire from wrapping around the wheels, thereby preventing pitch diameter effect from being introduced into the measurement. It is preferred that an arc of about 10° to 20° of wheels 5 and 6 project through the slots in the guides, as illustrated in FIG. 8.

Measuring wheel 6 is provided with a series of holes 94, which reduce the weight and inertia of the wheel, and similarly the drive wheel 5 is provided with a series of holes 95. Holes 95 are each provided with inward extensions 96 which provide access for the screws 92 of adjusting plate 90.

In practice, wheels 5 and 6 have a relatively large diameter, about 5 inches, and yet are relatively light in weight which reduces the inertia on starting and stopping, thus eliminating any inaccuracy in measurement caused by excess inertia in the wheels.

The operation of the feeding and measuring apparatus is similar to that described in U.S. patent application Ser. No. 07/480,770, filed Feb. 15, 1990. The wire 4 is frictionally engaged by the feed belts 7 and 19, causing the wire to be drawn from a supply coil or reel, not shown, and moved axially through the apparatus. When the belts 7 and 19 travel a predetermined programmed distance in the forward direction, the feed belts are then stopped. The measuring wheel 6 directly engages the wire as it is being fed and rotation of the measuring wheel actuates encoder 60 to generate a feedback signal. The feedback signal from the encoder is transmitted to a controller and accurately reflects the length of wire that was actually fed in the forward direction. If the correct length has been fed, the controller, after a programmed interval of time to allow for processing of the wire, causes the next successive length of the wire to be fed.

On the other hand, if wire slippage has occurred between the wire and the feed belt 7 and 19 and more or less than the predetermined length of wire has been fed, the encoder recognizes this incorrect length and the controller determines the direction and amount of slippage, and effects operation of the servo motor in the forward or reverse direction necessary to move the wire either forward or reverse to obtain the predetermined wire length.

With the apparatus of the invention, the measuring is carried out downstream of the drive belts 7 and 19 and the increased speed of drive wheel 5 tends to pull or stretch the wire in the area between the feed belts and the nip between wheels 5 and 6. Thus, the wire is maintained in a taut condition in this area and will not sag or buckle.

As a light spring biasing force is applied to the measuring wheel 6, indentation of the wheel into the plastic insulation on the wire is minimized, so that improved repeatability is obtained between different insulation types.

In addition, the guides 72 and 73 control the wire as it is being measured, so that it passes tangentially through the wheels 5 and 6, eliminating wrap around of the wire and preventing pitch diameter effect from being introduced into the measurement.

Because of these factors, the apparatus of the invention provides more accurate measurements of length and minimizes calibration when processing different gauges of wire, or wire having different types or thicknesses of insulation.

Various modes of carrying out the invention are contemplated as being within the scope of the following claims particularly pointing out and distinctly claiming the subject matter which is regard as the invention.

We claim:

1. A wire feeding and measuring apparatus, comprising a first drive unit including an endless feed belt, a second drive unit including a second endless feed belt disposed to cooperate with said first feed belt, said second drive unit also including a drive wheel disposed downstream in the direction of wire travel of said second belt, drive means for operating said feed belts to thereby feed the wire in an axial direction, means for moving one of said drive units in a direction toward and away from the other unit to bring the belts into and out of contact with said wire, means for driving said drive wheel in synchronization with said second belt and at a speed faster than the speed of said second belt, and a measuring wheel disposed opposite said drive wheel and engaged with said wire, said measuring wheel being driven by movement of said wire to provide a measurement of length of said wire.

2. The apparatus of claim 1, wherein said wheels have hard metallic peripheral surfaces.

3. The apparatus of claim 1, and including biasing means for biasing the measuring wheel into contact with the wire, said biasing means exerting a force in the range of about 2 to 4 lbs.

4. The apparatus of claim 1, an including guide means for maintaining the wire in a generally tangential relation to said measuring wheel as the wire is passed between the measuring wheel and said drive wheel, said guide means including a generally flat first guide surface disposed upstream of said measuring wheel and extending tangentially to said measuring wheel, said guide means also including a flat second guide surface disposed downstream of said measuring wheel and extending tangentially to said measuring wheel, said second guide surface spaced longitudinally downstream of said first guide surface, a portion of the periphery of said measuring wheel disposed in the space between said first and second guide surfaces.

5. A wire feeding and measuring apparatus, comprising feeding means for axially feeding a wire in a downstream direction, a rotatable drive member engaged with the wire and located downstream of said feeding means, a rotatable measuring wheel engaged with and driven by the wire and located opposite said drive member for measuring a length of wire being fed, and guide means for maintaining the wire in a tangential relation to said measuring wheel as the wire is passed between said measuring wheel and said drive member, said guide means including a flat first guide surface disposed to support the wire and extending tangentially to the measuring wheel, said guide means further including a curved second surface spaced from the periphery of said measuring wheel and conforming generally to the curvature of the measuring wheel.

6. The apparatus of claim 5, wherein said guide means also includes a second flat guide surface spaced longitudinally downstream of said first guide surface, said guide means also including an opening between said guide surfaces for receiving a portion of the periphery of said measuring wheel.

7. The apparatus of claim 6, wherein said portion inscribes an arc of about 10° to 20°.

8. The apparatus of claim 6, wherein said guide surfaces lie in a common plane.

9. A wire feeding and measuring apparatus, comprising feeding means for axially feeding a wire in a downstream direction, a rotatable drive member engaged with the wire and located downstream of said feeding means, a rotatable measuring wheel engaged with and driven by the wire and located opposite said drive member for measuring a length of wire being fed, encoder means operably connected to said measuring wheel for generating an electrical signal in accordance with rotation of said measuring wheel, biasing means for urging said measuring wheel into contact with said wire, fixed guide means, and a slide to carry said measuring wheel and said encoder means and slidable on said guide means, said biasing means comprising a spring connected to the slide and exerting a force in the range of 2 to 4 pounds to urge said measuring wheel into engagement with said wire.

10. The apparatus of claim 9, and including stop means to limit the movement of said measuring wheel in a direction toward said drive member.

11. A wire feeding and measuring apparatus, comprising feeding means for axially feeding a wire in a downstream direction, a rotatable drive member engaged with the wire and located downstream of said feeding means, a rotatable measuring wheel engaged with and driven by the wire and located opposite said drive member for measuring the length of wire being fed, encoder means operably connected to said measuring wheel for generating an electrical signal in accordance with rotation of said measuring wheel, fixed guide means, a slide to carry said measuring wheel and said encoder means and slidable on said guide means, a resilient member connected to the slide and exerting a force to urge said measuring wheel into engagement with said wire, stop means to limit the movement of said measuring wheel in a direction toward said drive member, and adjusting means connected to said stop means for adjusting the position of said stop means.

12. A wire feeding and measuring apparatus, comprising feeding means for axially feeding a wire in a downstream direction, a rotatable drive member engaged with the wire and located downstream of said feeding means, and rotatable measuring means engaged with and driven by the wire and located opposite said drive member for measuring a length of the wire being fed, and means for driving said drive member at a faster speed than said feeding means.

13. The apparatus of claim 12, wherein said feeding means comprises a pair of cooperating endless feed belts disposed to engage opposite portions of said wire.

* * * * *